United States Patent
Regnard De Lagny et al.

(10) Patent No.: US 8,473,146 B2
(45) Date of Patent: Jun. 25, 2013

(54) METHOD OF MANAGING MALFUNCTIONS OF A MODULAR-ARCHITECTURE CONTROL SYSTEM OF A MOTOR VEHICLE POWER PLANT AND CORRESPONDING CONTROL SYSTEM

(75) Inventors: Joseph Regnard De Lagny, La Norville (FR); Abdelmalik Belaid, Paris (FR); Sylvain Seyres, Gif sur Yvette (FR)

(73) Assignee: Renault S.A.S., Boulogne-Billancourt (FR)

( * ) Notice: Subject to any disclaimer, the term of this patent is extended or adjusted under 35 U.S.C. 154(b) by 294 days.

(21) Appl. No.: 12/809,432

(22) PCT Filed: Dec. 10, 2008

(86) PCT No.: PCT/EP2008/067239
§ 371 (c)(1),
(2), (4) Date: Oct. 27, 2010

(87) PCT Pub. No.: WO2009/083413
PCT Pub. Date: Jul. 9, 2009

(65) Prior Publication Data
US 2011/0040444 A1 Feb. 17, 2011

(30) Foreign Application Priority Data
Dec. 20, 2007 (FR) ...................................... 07 60137

(51) Int. Cl.
*G06F 19/00* (2006.01)
(52) U.S. Cl.
USPC ........................................ 701/29.2; 701/29.7

(58) Field of Classification Search
USPC ........... 701/29.1–29.2, 29.7–29.9, 31.7–32.1; 702/182–185
See application file for complete search history.

(56) References Cited

U.S. PATENT DOCUMENTS

| | | | |
|---|---|---|---|
| 5,388,045 A | 2/1995 | Kamiya et al. | |
| 5,481,906 A | 1/1996 | Nagayoshi et al. | |
| 5,922,038 A | 7/1999 | Horiuchi et al. | |
| 7,120,531 B1 * | 10/2006 | Melby et al. | 701/57 |
| 7,260,501 B2 * | 8/2007 | Pattipatti et al. | 702/183 |
| 2005/0068174 A1 * | 3/2005 | Oesterling et al. | 340/539.24 |

FOREIGN PATENT DOCUMENTS

| | | |
|---|---|---|
| DE | 196 38 377 | 4/1997 |
| DE | 196 07 429 | 9/1997 |
| DE | 10 2006 018 975 | 8/2007 |
| EP | 0 632 193 | 1/1995 |

\* cited by examiner

*Primary Examiner* — Yonel Beaulieu
(74) *Attorney, Agent, or Firm* — Oblon, Spivak, McClelland, Maier, & Neustadt, L.L.P.

(57) ABSTRACT

A method of managing information interchanged within a modular-architecture control system of a motor vehicle power plant and values of which are liable to be affected by malfunctioning of the control system and/or of the power plant. In the method an indication of the validity of the value of the information is allocated to each of the information items, this indication of validity being formulated by a module that generates the information on the basis of input indications received by the generating module and representative of a potential malfunctioning of this generating module or of another module.

13 Claims, 2 Drawing Sheets

Figure 1:
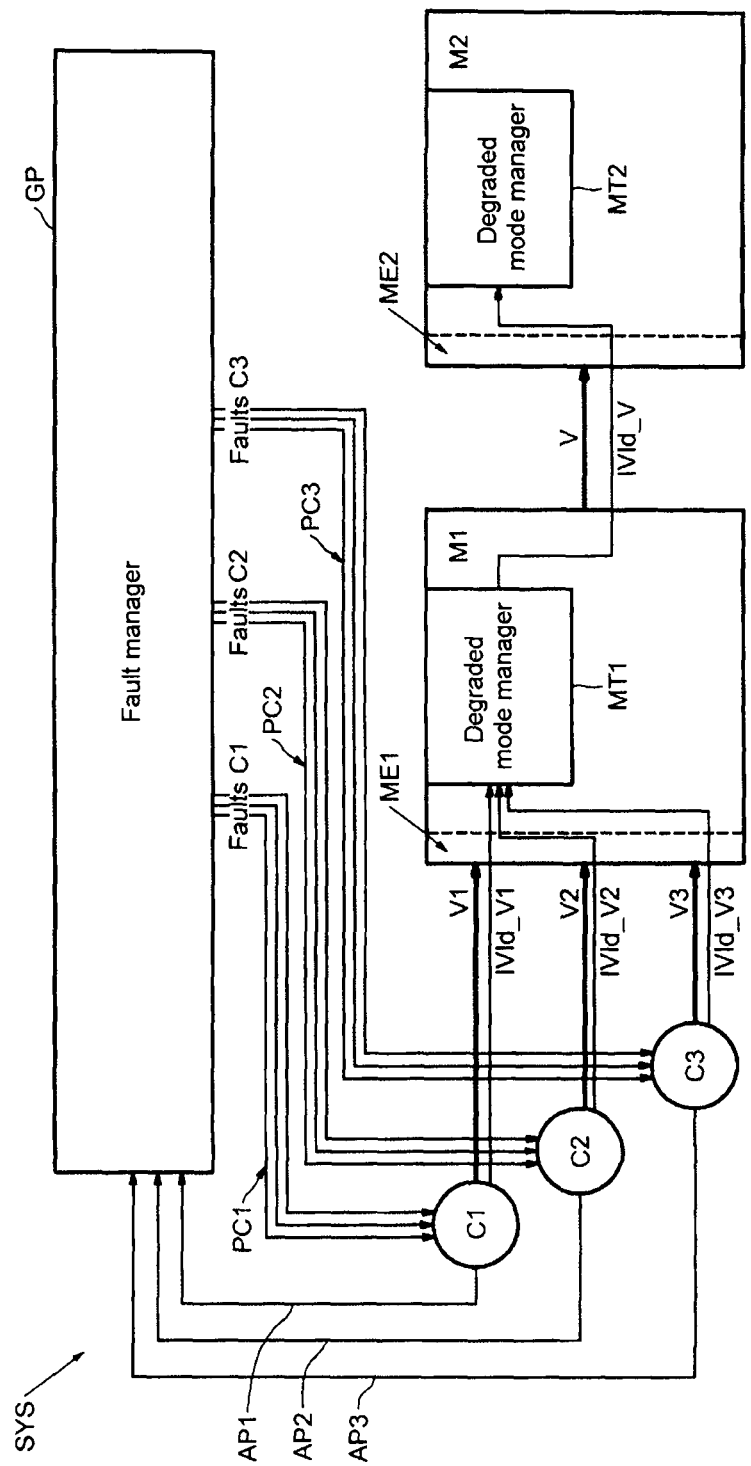

METHOD OF MANAGING MALFUNCTIONS OF A MODULAR-ARCHITECTURE CONTROL SYSTEM OF A MOTOR VEHICLE POWER PLANT AND CORRESPONDING CONTROL SYSTEM

The invention relates to motor vehicles, notably the control systems of motor vehicle drive trains, in particular for managing malfunctions of the control system and/or of the drive train.

All the motor vehicle drive train control computers incorporate onboard diagnostic strategies, with which to detect any failures of the control system (electrical or function fault of a component, for example), even of the drive train itself (leak or disconnection of an engine air feed pipe, for example).

These control computers must also incorporate reconfiguration strategies ("degraded modes"). Said strategies are used, when a failure has been identified by the computer, to adapt the management of the drive train in order to ensure that its operation is maintained as broadly as possible, while, as a priority, ensuring the safety of the users.

The growing requirements with regard to the services of the drive train, as much from a regulatory point of view (pollutant emission standards, regulations concerning the associated diagnostic) as from the user point of view (increase in safety requirements, increase in services, performance levels, consumption, pleasure, starting, etc.), incorporation of new functionalities (vehicle speed regulator/limiter, path control, etc.) lead an exponential growth in the complexity of the technical definition of the control systems and of the size of the associated software. This growth is obviously accompanied by a parallel growth in the possibilities of failure or of a component of the system, and therefore in the needs for diagnostic strategies and recovery modes (degraded modes).

To meet this strong constraint, a large majority of automobile manufacturers and suppliers of engine control systems are working toward putting in place control software based on a modular architecture, i.e. constructed from individual "building blocks" (or modules). The aim of such an architecture is, on the one hand, to ensure the containment (limitation of the scope of impact of any modification, change or error, to a defined area of the software) and on the other hand to improve the quality of the software while reducing its cost, by the reuse, as much as possible, of modules already developed and validated.

At the present time, all onboard engine control systems incorporate a failure management function, that is hereinafter designated "fault manager". The generic principle of this function is as follows:

The modules forming the control software and incorporating failure detection strategies communicate with the manager each time each of these strategies is implemented, by indicating to it the individual binary result (failure detected or not) of the latter. The fault manager filters these individual information items to confirm the failure or its disappearance. Depending on the strategies concerned, this filtering may be more or less complex. Simple examples include:
 a purely time-oriented filtering: if the failure is detected for a time greater than a threshold T1, it is confirmed present. If the absence of failure is detected for a time greater than a threshold T2, the failure is declared absent;
 a counter-based filtering: a counter C, bounded by two values CMIN and CMAX, is initialized with a given value (chosen by calibration). Upon each individual detection of the failure, this counter C is incremented by a value INC. Upon each individual detection of the absence of the failure, this counter is decremented by a value DEC. When the counter C reaches the value CMAX, the failure is confirmed present. When the counter C reaches the value CMIN, it is declared absent.

For each possible failure of the system, the fault manager provides all the modules that make up the control software with a binary information item (generically designated "fault") indicating the presence or absence of the failure.

When a failure is confirmed, the fault manager stores it in the non-volatile memory of the computer. Depending on the embodiment selected, it may also store additional information (values of certain parameters or physical quantities upon confirmation of the failure for example). These records can be consulted using onboard diagnostic tools, thus offering assistance to the repairer in rectifying the failure when the vehicle is returned to the workshop for repair.

In most engine control systems, the fault manager also manages, depending on the fault concerned, the interface with the vehicle dashboard to use indicator lamps or text or audible messages to alert the driver to the system failure state.

In practice, for reasons associated, on the one hand, with repairability and on the other hand with the management of driver alerts and possible degraded modes resulting from the failure, the fault manager provides, for one and the same failure, a number of fault booleans, such as, for example, fault confirmed, fault confirmed and maintained, fault confirmed and stored and fault stored.

In the usual failure and degraded mode management implementations, each of the software modules consumes the above information for the failures that affect its operation. Depending on the value of these information items, it initiates the necessary recovery strategies.

However, the exponential growth in the complexity of the engine control systems and the increased needs to reuse modules make this implementation difficult.

In practice, the number of possible failures on current engine control systems can reach into the hundreds (approximately 300 on a standard diesel system, and 200 on a controlled ignition system). For each of these failures, the designer of the module must pose the question of the impact of said failure on the operation of his module, and the most suitable degraded mode. Despite the care given to the task and the various tools that may be available (functional analysis, failure mode, effects and criticality analysis), the risks of errors and/or omissions are numerous.

The problem is made all the more difficult in the context of the reuse of modules: depending on the environment in which a "reused" module is incorporated, the possible faults may differ widely, and it is then necessary to modify the module to adapt it to its environment, which is in total conflict with the initial reuse objective.

One solution usually implemented to address this issue is as follows:
 each degraded mode available in a given module can be activated by a logic switch controlled by this module,
 this switch is activated by a list of faults supplied by the fault manager, and these faults are chosen by calibration. This makes it possible to adapt the module to its environment with no software modification.

However, this solution also proves very difficult to implement given the increasing complexity of the engine control systems.

If we consider the example of engine control software consisting of 150 modules, each having on average just one degraded mode, all of the system being able to suffer 300 failures, the resulting number of degraded mode calibration possibilities is very high. This complexity these days is reaching levels such that the control of these systems and of the associated calibrations is becoming critical, and increasingly difficult to achieve.

Finally, it should be noted that, in this type of embodiment, the management of multiple failures is even more difficult. As an example, in the event of failure of a sensor (atmospheric pressure sensor for example), a relevant degraded mode may be the use of a value deriving from a model, a model that uses as inputs other physical values (for example the pressure measured in the inlet manifold). In the case where the system suffers a failure of both the atmospheric pressure sensor and the inlet manifold pressure sensor, it is essential to provide a specific degraded mode. This type of issue further increases the complexity of the management of the degraded modes, already very difficult in the single failure case described previously.

One aim of the invention is to adapt the management of the resulting errors and degraded modes, possibly with a modular architecture, on the one hand by ensuring the compatibility of the choices made with the architecture retained, and on the other hand by optimizing the safety and availability of the system for its users.

The invention relies notably on the following observation: to initiate a degraded mode at the right time, a module needs to know the level of confidence (or the state of degradation) of the information or variables that it consumes or of the functions that it invokes, and not the reason or reasons behind the initiation of this degraded mode.

Thus, according to one embodiment, each information item or variable exchanged between software modules for which it is relevant is assigned a validity indicator describing the confidence level or the state of degradation associated with this information item or variable. This indicator is generated by the generator module of the variable concerned, according to the validity indicators of these input variables.

In the case where the module incorporates diagnostic strategies (for example, electrical diagnostic for an acquisition module of a sensor, functional loop deviation diagnostic for a regulation module), it receives the resultant fault signal or signals from the fault manager and uses said signals to produce the validity indicators associated with these output variables or information items.

The validity indicator is used to characterize the level of confidence granted to the variables or information items exchanged between software modules, but can also be extended to the characterization of the state of a function as a whole, in the case of operation in the presence of a failure (for example, to indicate that a regulation function is deactivated because of a fault).

The invention thus makes it possible notably to simplify the exchanges between modules and allows for much easier reuse of the modules.

Thus, according to one aspect of the invention, there is proposed a method for managing information exchanged within a modular-architecture control system of a motor vehicle drive train and the values of which are likely to be affected by a malfunction of said control system and/or of said drive train. In this method, each of these information items is assigned a validity indication for the value of said information item, this validity indication being generated by the module generating said information from input indications received by said generator module and representative of a possible malfunction of this generator module or of another module.

According to one embodiment in which the generator module is a module for acquiring at least one parameter, the input indications are the indicators representative of a possible fault state of said acquisition module.

These indicators representative of a possible fault state of said acquisition module may be delivered by a fault manager module.

According to another embodiment, the input indications of said generator module are the validity indications associated with information items delivered to said generator module by another module.

These validity indications may be likely to take several different values respectively representative of different levels of malfunction.

According to another aspect of the invention, there is proposed a modular-architecture control system for a motor vehicle drive train, comprising a number of modules able to exchange information, the values of which are likely to be affected by a malfunction of said control system and/or of said drive train, each of these modules comprising input means able to receive input indications representative of a possible malfunction of this module or of another module, at least one of these modules comprising output means able to deliver at least one information item and generation means able to assign said at least one information item a validity indication concerning the value of said at least one information item.

According to an embodiment in which at least one module is a module for acquiring at least one parameter, the input indications intended to be received by the input means of this acquisition module are indicators representative of a possible fault state of said acquisition module.

According to one embodiment, the system also comprises a fault manager module able to deliver indicators representative of a possible fault state of said acquisition module.

According to one embodiment, the input indications intended to be received by the input means of at least one module are validity indications associated with information items delivered to this module by another module.

Figure 2:
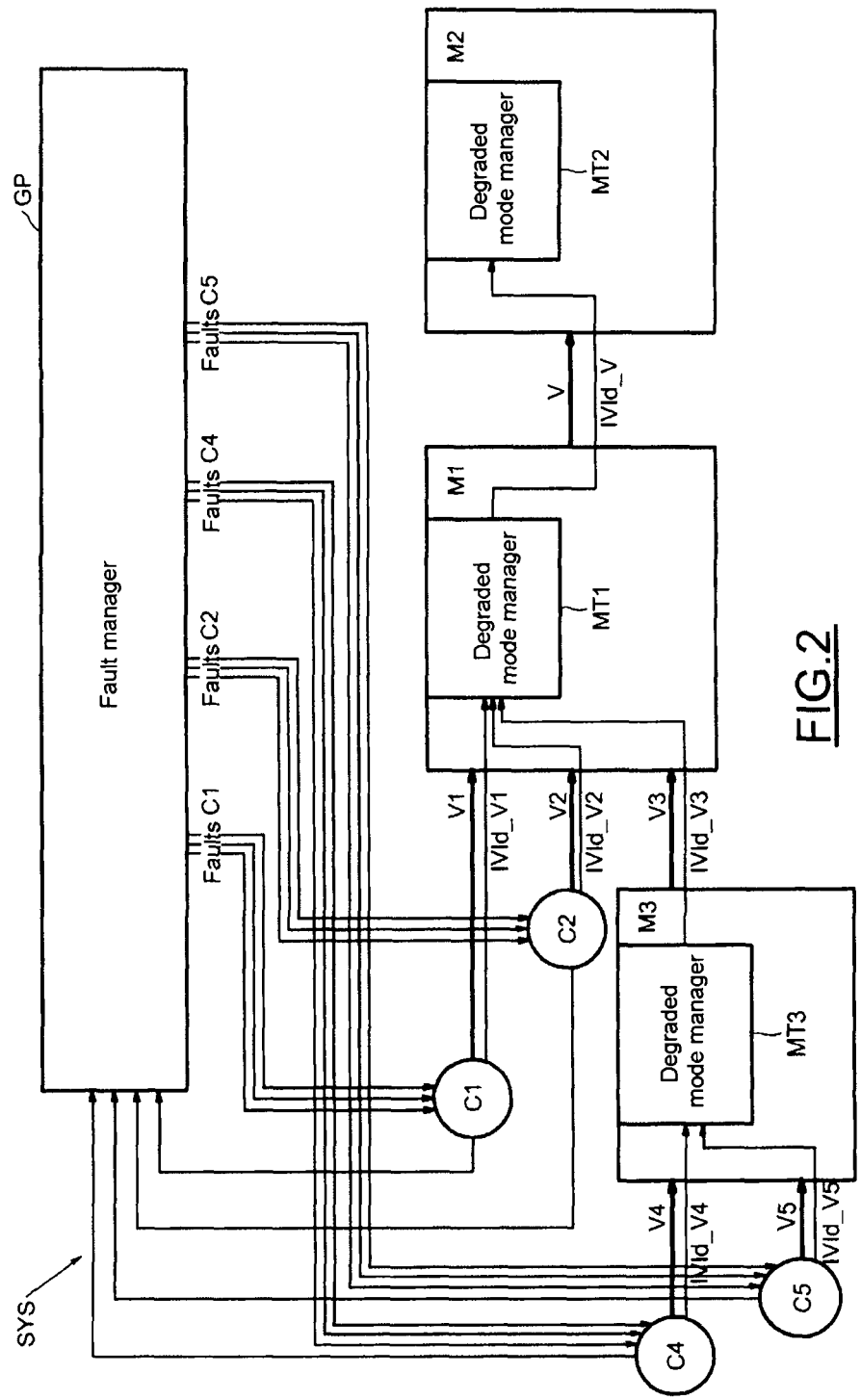

Other benefits and features of the invention will become apparent from studying the detailed description of implementations and embodiments, which are by no means limiting, in which:

FIGS. 1 and 2 diagrammatically illustrate two embodiments and implementations of the invention.

In FIG. 1, the reference SYS designates a control system for a motor vehicle drive train, regardless of whether the motor vehicle is of petrol or diesel type. The control system has a modular architecture in as much as it comprises various modules incorporated, for example, in a software manner within a control computer, such as, for example, a fault manager module GP, and various functional modules M1, M2.

The control system SYS also comprises three acquisition modules or sensors C1, C2, C3 capable of delivering respectively information items V1, V2 and V3.

Each functional module also comprises processing means MT1, MT2 capable of implementing a degraded operating mode of the module.

The acquisition modules C1, C2, C3, in the presence of potential failures of their operation, deliver failure information items (arrows AP1, AP2, AP3) to the fault manager GP and receive in return confirmed fault signals PC1, PC2, PC3, booleans for example, from the fault manager. A fault is said to be confirmed when it results, for example, from repeated failure indications sent by the acquisition module to the fault manager GP.

Based on the signals PC1, PC2 and PC3, the acquisition modules C1, C2, C3 generate validity indicators associated with their output information items V1, V2, V3 and respectively referenced IV1d_V1, IV1d_V2, IV1d_V3.

Thus, the only module consuming fault signals is the module incorporating the diagnostic strategy for these faults (whether it is an acquisition module or another module) and no other module.

The module M1 receives on its input means ME1 the input information items V1, V2, V3 and the associated validity indications, and the processing means MT1 use these validity indications to generate a validity indication IV1d_V associated with the output variable V delivered by the module M1.

The processing means MT2 of the module M2 are informed of the state of validity of the value of the input information item V by virtue of the validity indicator IV1d_V. The processing means MT2 can thus in turn apply a specific degraded mode.

In the modular architecture illustrated in FIG. 2, the acquisition modules C1 and C2 are unchanged from those illustrated in FIG. 1.

However, two other acquisition modules C4 and C5 are provided.

In a manner similar to what has already been described, based on the state of the confirmed fault signals, the acquisition modules produce the validity indicators associated with their respective outputs V1, V2, V4 and V5.

The functional module M3 receives as input the validity indicators associated with the input variables V4 and V5 and the processing means MT3 generate the validity indicator IV1d_V3 associated with the output variable V3 produced by this module M3.

The processing means MT1 of the module M1 also receive this validity indicator IV1d_V3.

It should thus be noted that, by virtue of the application of the validity indicators, the transition from the architecture illustrated in FIG. 1 to the architecture illustrated in FIG. 2 has absolutely no impact on the modules M1 and M2 because said modules receive, in both cases, the same validity indications. Consequently, these modules M1 and M2 may be totally reusable from one architecture to another.

Another aim of the diagnostic and of the degraded modes of the engine control systems is to optimize the availability of the engine in the event of failure. In this context, a "good/bad" binary information item borne by a validity indication may not be optimum in certain cases. As a matter of fact, and by way of nonlimiting example:

in the case of acquisition from a sensor, if an electrical failure of said sensor is detected, it is sometimes possible to reconstruct a value that is "close" to reality from a model using other information available in the system (for example, reconstruction of the flow rate of cool air entering into the engine based on the engine speed, the temperature and intake pressure in the case of a failure of the intake flow meter). In this case, the modules consuming the variable concerned should be informed of this state;

in the case of an intermediate calculation (for example, estimation of engine friction losses), certain variables (called "first order") are essential (engine speed and temperature in the example), whereas others (called "second order") are used only to calculate corrective terms with which to obtain the accuracy required in normal mode (still in the example, alternator load, air conditioning circuit pressure, for example). Depending on the input variable that has failed, the impact on the result will therefore be different. Once again, the modules using the variable concerned should be informed differently of these different states;

in the case of an actuator (for example, an exhaust gas recirculation valve), the nature of the failure may have particular significance for the operation of the modules. In the example, a short circuit may lead to a fully open valve, whereas an open circuit will lead to a fully closed valve. The modules affected by these different states should also be informed;

in the case of a function (for example, regulation of the rate of recirculation of the exhaust gases from a diesel engine, assuming that said regulation is performed by means of a double regulation loop (one loop on the flow rate of cool air entering into the engine, the second on the level to which the recirculation valve is open), the function may reach different levels of degraded modes depending on the failure concerned. Examples include single loop mode regulations in case of loss of a sensor used for the measurement of the other loop, or a complete breakdown of the regulation in the event of failure affecting the valve itself. Here too, the modules consuming the state of this function should be informed differently.

Consequently, provision is advantageously made for, depending on the needs expressed by the consuming modules and the capabilities of the generator module, a validity indicator to be able to take more than two values or different levels. In the proposed implementation, a maximum of eight different levels are provided, the two extreme levels respectively corresponding to the nominal case and the worst case. In the examples discussed previously, this can lead to the following example:

for the acquisition from a sensor:
   level 0: no failure affecting the measurement of the sensor. The value transmitted is valid;
   level 1: failure affecting the measurement of the sensor. A calculation model is used as a substitute. The value transmitted is not exact, but nevertheless close to reality;
   level 7: failure affecting the measurement of the sensor. There is no calculation model that can be used as a substitute, or a second failure renders the latter unavailable. The value transmitted is a substitute value;
   if necessary, other intermediate levels depending on the need;

for an actuator:
   level 0: no failure. The actuator is operating normally;
   level 1: the actuator is blocked in the idle position;
   level 7: the actuator is blocked in the maximum working position (fully open);
   where appropriate, other intermediate levels depending on the need;

for an intermediate variable or information item:
   level 0: all the variables used for the calculation are valid. The calculated value is therefore valid;
   level 1: a second order input variable is degraded or invalid, or a first order input variable is degraded. Consequently, the output variable resulting from the calculation is degraded, but nevertheless remains close to reality;
   level 7: several second order input variables are degraded or invalid, or a first order input variable is invalid. Consequently, the output variable is not representative of the reality, or is a substitute value;
   if necessary, other intermediate levels depending on the need;

for a function:
   level 0: the function is nominal;

level 1: a failure leads to the switchover of the function to an "intermediate" degraded mode (for example, single regulation loop in the case of a double loop, open loop mode control, etc.);

level 7: the function is deactivated and is placed in the idle position (the safest). One example of this is the breakdown of the supercharging function or of the exhaust gas recirculation regulation function of a diesel engine;

if necessary, other intermediate levels depending on the need (for example, to differentiate open loop mode operation from single regulation loop mode operation).

By associating several different values respectively representative of different levels of malfunction with the validity indications, it becomes possible notably:

to simply adapt the behavior of the system to cases of multiple failures. In practice, the subdividing of the software into individual modules means that said modules can be relatively simple. Analyzing the malfunctioning behavior of a module (i.e. the impact of possible module input errors on said module's outputs) is therefore easy, and the multiplicity of the possible levels of the validity indicators enables the designer of the module to easily define said modules according to the state of the inputs, including in the case in which several inputs have validity indicators that differ from the state 0. Thus, the adapting of the behavior of the module (and therefore, by assembly, of the modules of the complete control system) is achieved automatically and naturally;

the immediate reuse of modules with no adaptation in other engine control systems and/or architectures. In practice, obviously subject to the fact that the inputs and outputs expected of the module in a new environment are the same, said module is incorporated, adapts its degraded modes to the states of its inputs, and produces the validity indicators associated with its outputs without any modification being necessary. This is due to the fact that the module adapts its behavior to the validity indicators for its inputs, independently of the basic causes leading to their changes of values.

Thus, the behavior of the assembled system is adapted automatically and more appropriately to its failure state. The maximum availability of the system is therefore naturally guaranteed, regardless of its architecture. This is particularly important in the context of the proliferation of control systems given the diversity of the needs (extension of the vehicle range, adaptation to local needs and regulations in the context of globalization of the automobile market, etc.). The workload involved in studying the impacts of a local modification on the system, or even to analyze a new system consisting of an assembly of existing modules, is considered to be reduced.

The definition and the method of generation of the validity indications associated with the different variables or information items are, for example, completed during the software design of the control system.

In this respect, a module consuming an input information item or variable, or the state of a function or of a component, includes needs with respect to the latter (desired accuracy/degradation levels and behavior applied in response to these levels).

The designer of a software module, based on these requirements and the specific capabilities of the module (diagnostic strategy and/or degraded mode provided) generate the different validity levels attached to the variable or to the state of the function or of the component that it generates and the physical meaning of these levels, as well as the switchover conditions within a level. The software programming for the generation of the different validity indications, and the management of the resulting degraded modes are then programmed based on this design information.

While implementing such a process is relatively time-consuming in the context of a first application of a modular software architecture, the saving is made thereafter for all developments and upgrades, following this first application, amply justify this one-off load.

The invention claimed is:

1. A method for managing information exchanged within a modular-architecture control system of a motor vehicle drive train and values of which are likely to be affected by a malfunction of the control system and/or of the drive train, the method comprising:
   receiving, at least one acquisition module, input indications representing a possible malfunction of the at least one acquisition module or of another module;
   outputting information items from the at least one acquisition module to another module; and
   assigning, via a processor, each information item a validity indication having a confidence level value representing the accuracy of the information item, the validity indication being generated by the at least one acquisition module based on the input indications received by the at least one acquisition module.

2. The method as claimed in claim 1, wherein
   a generator module acquires at least one parameter, and
   the input indications are indicators representative of a possible fault state of the at least one acquisition module.

3. The method as claimed in claim 2, wherein the input indications representative of a possible fault state of the acquisition module are received from a fault manager module.

4. The method as claimed in claim 2, wherein the at least one parameter received by the generator module is a validity indication associated with information items delivered to the generator module by another module.

5. The method as claimed in claim 1, wherein the confidence level value represents different levels of malfunction.

6. The method as claimed in claim 1, wherein each validity indication is generated by the at least one acquisition module based on failure indications detected by the at least one acquisition module.

7. A modular-architecture control system for a motor vehicle drive train, comprising:
   a plurality of acquisition modules configured to exchange information having values which are likely to be affected by a malfunction of the control system or the drive train, each of the acquisition modules including:
     an input that receives input indications representative of a possible malfunction of the acquisition module or of another module,
     an output that transmits at least one information item to another module, and
     a generator that assigns, via a processor, each information item a validity indication having a confidence level value representing the accuracy the value of the information item.

8. The system as claimed in claim 7, wherein at least one generator module acquires at least one parameter, and
   the input indications received by the input of the acquisition modules are indicators representative of a possible fault state of the acquisition module.

9. The system as claimed in claim 8, further comprising:
   a fault manager module configured to deliver the input indications representative of a possible fault state of at least one acquisition module.

10. The system as claimed in claim 8, wherein the at least one parameter received by the at least one generator module are validity indications associated with information items delivered to the generator module by another module.

11. The system as claimed in claim 7, wherein the confidence level value represents different levels of malfunction.

12. The system as claimed in claim 7, wherein at least one acquisition module detects its own failure.

13. The method as claimed in claim 5, wherein the confidence level value indicates whether the information item value is valid, an approximation, or a substitute value.

* * * * *